(12) United States Patent
Fleizach et al.

(10) Patent No.: US 11,019,418 B2
(45) Date of Patent: May 25, 2021

(54) REMOTELY CONTROLLING A HEARING DEVICE

(71) Applicant: Apple Inc., Cupertino, CA (US)

(72) Inventors: Christopher Brian Fleizach, Morgan Hill, CA (US); Edwin W. Foo, Sunnyvale, CA (US); Ian M. Fisch, Santa Cruz, CA (US); Eric Taylor Seymour, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/617,944

(22) Filed: Jun. 8, 2017

(65) Prior Publication Data

US 2017/0280225 A1    Sep. 28, 2017

Related U.S. Application Data

(63) Continuation of application No. 14/633,575, filed on Feb. 27, 2015, now Pat. No. 10,206,024, which is a
(Continued)

(51) Int. Cl.
*H04R 1/10* (2006.01)
*H04R 25/00* (2006.01)
*H04M 1/02* (2006.01)

(52) U.S. Cl.
CPC .......... *H04R 1/1041* (2013.01); *H04R 25/558* (2013.01); *H04M 1/0258* (2013.01);
(Continued)

(58) Field of Classification Search
CPC .. H04R 1/1041; H04R 25/558; H04R 25/554; H04R 25/70; H04R 2225/39;
(Continued)

(56) References Cited

U.S. PATENT DOCUMENTS

| 4,920,570 A | 4/1990 | West et al. |
| 7,966,577 B2 * | 6/2011 | Chaudhri .............. G06F 3/0482 |
| | | 345/473 |

(Continued)

FOREIGN PATENT DOCUMENTS

| CN | 101075180 A | * | 11/2007 |
| JP | 4308451 B2 | * | 8/2009 |
| KR | 20090012753 A | * | 2/2009 |

OTHER PUBLICATIONS

Siemens AG, "Hearing Aids with Sound Recording Capability," IP.com Prior Art Database Disclosure No. IPCOM000182884D, Idea: Aun Yong Hong, Sing Nan Robin Ku and Boon Siang Tan, May 27, 2009.
(Continued)

*Primary Examiner* — Davetta W Goins
*Assistant Examiner* — Kuassi A Ganmavo
(74) *Attorney, Agent, or Firm* — Morgan, Lewis & Bockius LLP

(57) ABSTRACT

An electronic device with a display is paired with a set of wireless audio output devices, including a first wireless audio output device for outputting audio to a right ear of a user and a second wireless audio output device for outputting audio to a left ear of the user. In response to a request to display status information about the set of wireless audio output devices, the electronic device displays a status user interface, including concurrently displaying a first battery status indicator for the first wireless audio output device with an indication that battery status indicator relates to the device for outputting audio to the right ear of the user and a second battery status indicator for the second wireless audio output device with an indication that battery status indicator relates to the device for outputting audio to the left ear of the user.

27 Claims, 13 Drawing Sheets

Related U.S. Application Data continuation of application No. 13/608,459, filed on Sep. 10, 2012, now Pat. No. 8,971,556.

(60) Provisional application No. 61/657,861, filed on Jun. 10, 2012.

(52) U.S. Cl.
CPC ............ *H04R 25/554* (2013.01); *H04R 25/70* (2013.01); *H04R 2225/39* (2013.01); *H04R 2225/41* (2013.01); *H04R 2420/07* (2013.01); *H04R 2430/01* (2013.01)

(58) Field of Classification Search
CPC ............ H04R 2225/41; H04R 2225/55; H04R 2420/07; H04R 1/1016; H04R 2430/01; H04M 1/7253
See application file for complete search history.

(56) References Cited

U.S. PATENT DOCUMENTS

| | | | |
|---|---|---|---|
| 8,055,001 B2 | 11/2011 | Boguslavskij | |
| 8,145,144 B2 | 3/2012 | Krenz et al. | |
| 8,189,835 B2 | 5/2012 | Dietz | |
| 9,167,348 B1* | 10/2015 | Vartanian | H04R 1/1041 |
| 2003/0064746 A1 | 4/2003 | Radar et al. | |
| 2005/0009577 A1* | 1/2005 | Kangas | H04M 1/7253 |
| | | | 455/572 |
| 2005/0099220 A1* | 5/2005 | Sato | H03J 1/0025 |
| | | | 327/337 |
| 2005/0136839 A1* | 6/2005 | Seshadri | H04M 1/05 |
| | | | 455/41.2 |
| 2006/0135218 A1* | 6/2006 | Son | H04B 1/3877 |
| | | | 455/573 |
| 2006/0251277 A1* | 11/2006 | Cho | H04M 1/6066 |
| | | | 381/311 |
| 2007/0009123 A1 | 1/2007 | Aschoff et al. | |
| 2008/0049957 A1 | 2/2008 | Topholm | |
| 2008/0058037 A1* | 3/2008 | Dunn | H04R 1/1041 |
| | | | 455/575.2 |
| 2008/0080719 A1* | 4/2008 | Ahn | H04M 1/6066 |
| | | | 381/17 |
| 2009/0108801 A1* | 4/2009 | Kozisek | H04M 1/0258 |
| | | | 320/103 |
| 2010/0069114 A1* | 3/2010 | Lee | H04M 1/585 |
| | | | 455/556.1 |
| 2010/0119093 A1* | 5/2010 | Uzuanis | H04R 25/70 |
| | | | 381/312 |
| 2010/0130131 A1* | 5/2010 | Ha | H04M 1/7253 |
| | | | 455/41.3 |
| 2011/0032071 A1* | 2/2011 | Tondering | H04B 1/202 |
| | | | 340/4.31 |
| 2011/0063103 A1* | 3/2011 | Lee | H04M 1/6066 |
| | | | 340/505 |
| 2011/0087964 A1* | 4/2011 | Patterson | G06F 3/165 |
| | | | 715/716 |
| 2011/0293123 A1 | 12/2011 | Neumeyer et al. | |
| 2012/0183165 A1 | 7/2012 | Foo et al. | |
| 2012/0213393 A1 | 8/2012 | Foo et al. | |
| 2012/0215532 A1 | 8/2012 | Foo et al. | |
| 2013/0316649 A1* | 11/2013 | Newham | H04W 88/04 |
| | | | 455/41.2 |
| 2014/0003641 A1* | 1/2014 | Neumeyer | H04R 25/30 |
| | | | 381/323 |
| 2016/0253145 A1* | 9/2016 | Lee | G06F 3/04883 |
| | | | 381/79 |

OTHER PUBLICATIONS

Siemens AG, "Wi-Fi Controller for Hearing Aid," IP.com Prior Art Database Disclosure No. IPCOM000189544D, Idea: Boon Siang Tan and Meng Kiang Lim, Nov. 23, 2009.
Siemens AG, "Input Dependant Hearing Aid User Control," IP.com Prior Art Database Disclosure No. IPCOM000205254D, Idea: Andre Steinbub, Mar. 22, 2011.
Office Action, dated Apr. 11, 2014, received in U.S. Appl. No. 13/608,459, 10 pages.
Notice of Allowance, dated Oct. 23, 2014, received in U.S. Appl. No. 13/608,459, 9 pages.
Office Action, dated Jun. 23, 2016, received in U.S. Appl. No. 14/633,575, 9 pages.
Final Office Action, dated Feb. 8, 2017, received in U.S. Appl. No. 14/633,575, 10 pages.
Office Action, dated Apr. 4, 2018, received in U.S. Appl. No. 14/633,575, 9 pages.
Final Office Action, dated Feb. 7, 2018, received in U.S. Appl. No. 14/633,575, 9 pages.
Notice of Allowance, dated Oct. 31, 2018, received in U.S. Appl. No. 14/633,575, 9 pages.

\* cited by examiner

REMOTELY CONTROLLING A HEARING DEVICE

RELATED APPLICATION

This application is a continuation of U.S. patent application Ser. No. 14/633,575, filed on Feb. 27, 2015, which is a continuation of U.S. patent application Ser. No. 13/608,459, filed on Sep. 10, 2012, now U.S. Pat. No. 8,971,556, which claims the benefit of U.S. Provisional Patent Application No. 61/657,861, filed on Jun. 10, 2012, all of which are hereby expressly incorporated herein by reference in their entirety.

TECHNICAL FIELD

The present disclosure relates to hearing devices and more specifically to remotely controlling a hearing device.

BACKGROUND

Hearing devices have been used to amplify sound for many years. Early hearing devices were simple funnel like amplification cones placed in the ear such as ear trumpets or ear horns. Modern hearing devices are high tech computing devices equipped with multiple speakers and types of speakers and are capable of receiving sound data from multiple audio data sources such as microphones attached to the hearing device as well as being able to stream audio data directly to the hearing device. With this advancement in technology comes an increase in the control and flexibility of hearing devices. For example, hearing devices can be adjusted to perform optimally in multiple environments.

In addition, modern hearing devices can be very small and placed discreetly inside the ear, almost unnoticeable to others. While creating smaller, more powerful and more flexible hearing devices has plenty of benefits over older styles, one problem that has arisen is the ability to easily and quickly changing settings on the hearing device. For example, smaller hearing devices leave less room for buttons to change settings and are inconvenient to reach when placed within the ear. Further, with the highly specialized functionality that can optimize performance based on different environments, the settings need to be constantly changed to receive the full benefit of the hearing device.

Thus, there exists a need to be able to quickly and easily change the settings on a hearing device.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for remotely controlling a hearing device. A hearing device can be configured to communicate with a control device using an established transmission protocol such as Bluetooth® or other similar type of communications standard. The hearing device can be configured to transmit status data to the control device. For example, status data can include current settings of the hearing device such as multiple volume setting and stored program settings optimized for a specific environment.

Upon receiving the status data, the control device can be configured to display the status data in a settings interface. For example, the settings interface can be configured to display the current settings of the hearing device as well as receive input specifying a new setting. Upon receiving the input, the control device can be configured to send a command to the hearing device to change the current setting to be the new setting specified by the received input.

In some embodiments, the control device can be configured to automatically change the settings of the hearing device based on a determined current environment of the hearing device. For example, the hearing device can be set to a stored program optimized to a specific environment. The hearing device can be configured to determine the current environment of the hearing device and determine whether another available stored program is better suited for the current environment and, if so, send a command to change the stored program to the program better suited for the current environment. The current environment can be determined in numerous ways. For example, the environment can be determined based on the location of the hearing device which can be assumed based on the location of the control device connected to the hearing device. It can also be determined from another device connected to the control device. For example, if the control device is connected to a car, it can be determined that the environment of the hearing device is in a car.

The control device can also be configured to initiate a quick mode that allows the settings on the hearing device to be viewed and changed quickly. For example, quick mode can be configured to initiate upon receiving a special input on buttons of the control device. For example, three clicks of the home button within a specified time. Once initiated, quick mode can present a streamlined version of the setting interface where multiple related setting can be displayed as one setting and adjusted as one setting. For example, the sound to a left and right ear can be combined into one combined volume and adjusted as one setting. Further, quick mode can override controls of the control device that change settings of the control device to receive input used to change settings of the hearing device. For example, a button configured to increase the volume on the control device, when selected, can send a command to the hearing device to increase the volume on the hearing device.

The control device can also include a remote listen mode configured to enable the control device to receive audio data from a microphone and transmit the audio data to the hearing device. The control device can also include a data buffer configured to store the audio data received from the microphone. The control device can use the audio data stored in the data buffer to manipulate the transmission of the audio data to the hearing device, for example, allowing a user to rewind and pause the received audio data.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
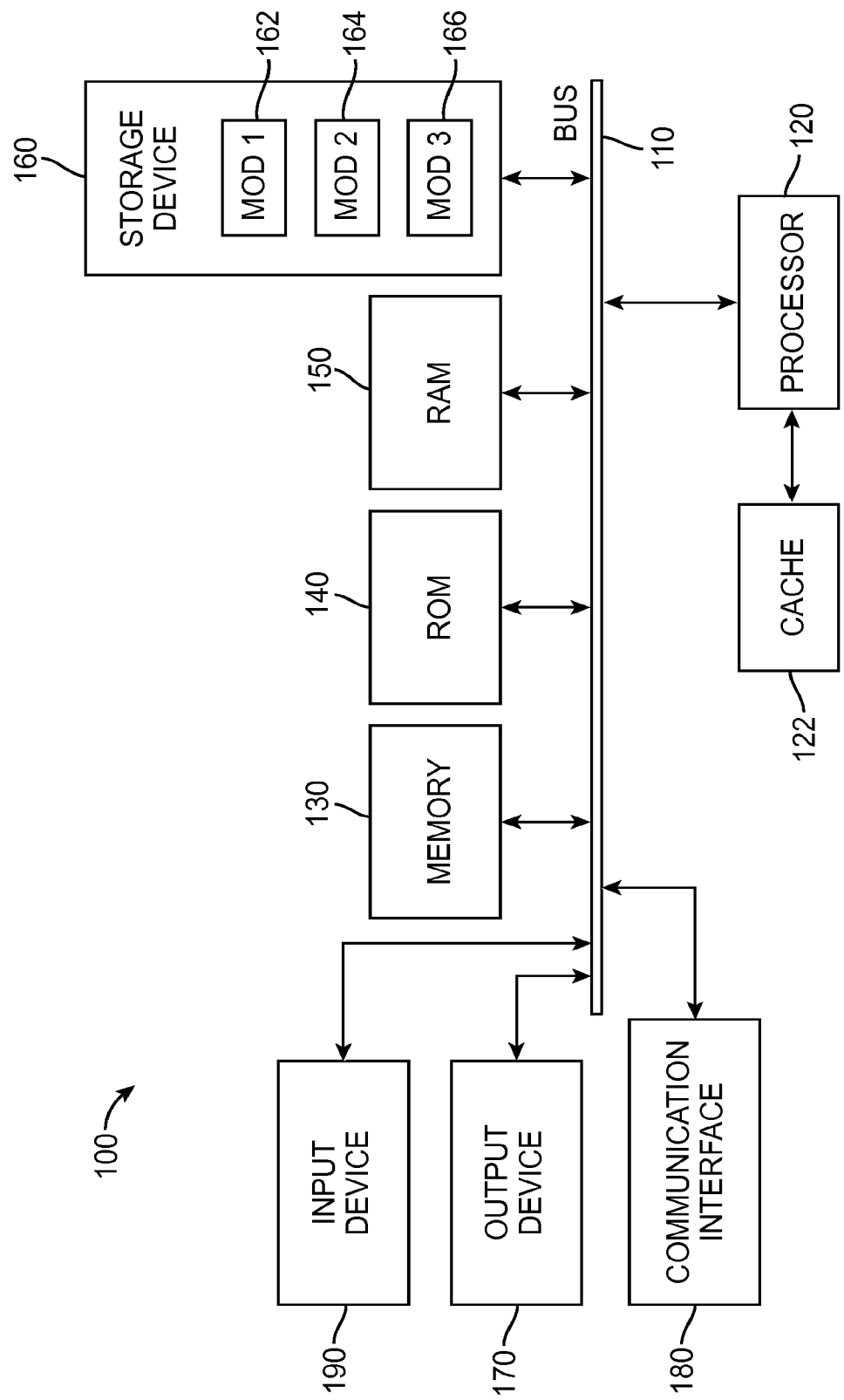
FIG. 1 illustrates an exemplary system embodiment.

FIG. 1 illustrates an exemplary system 100 that includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
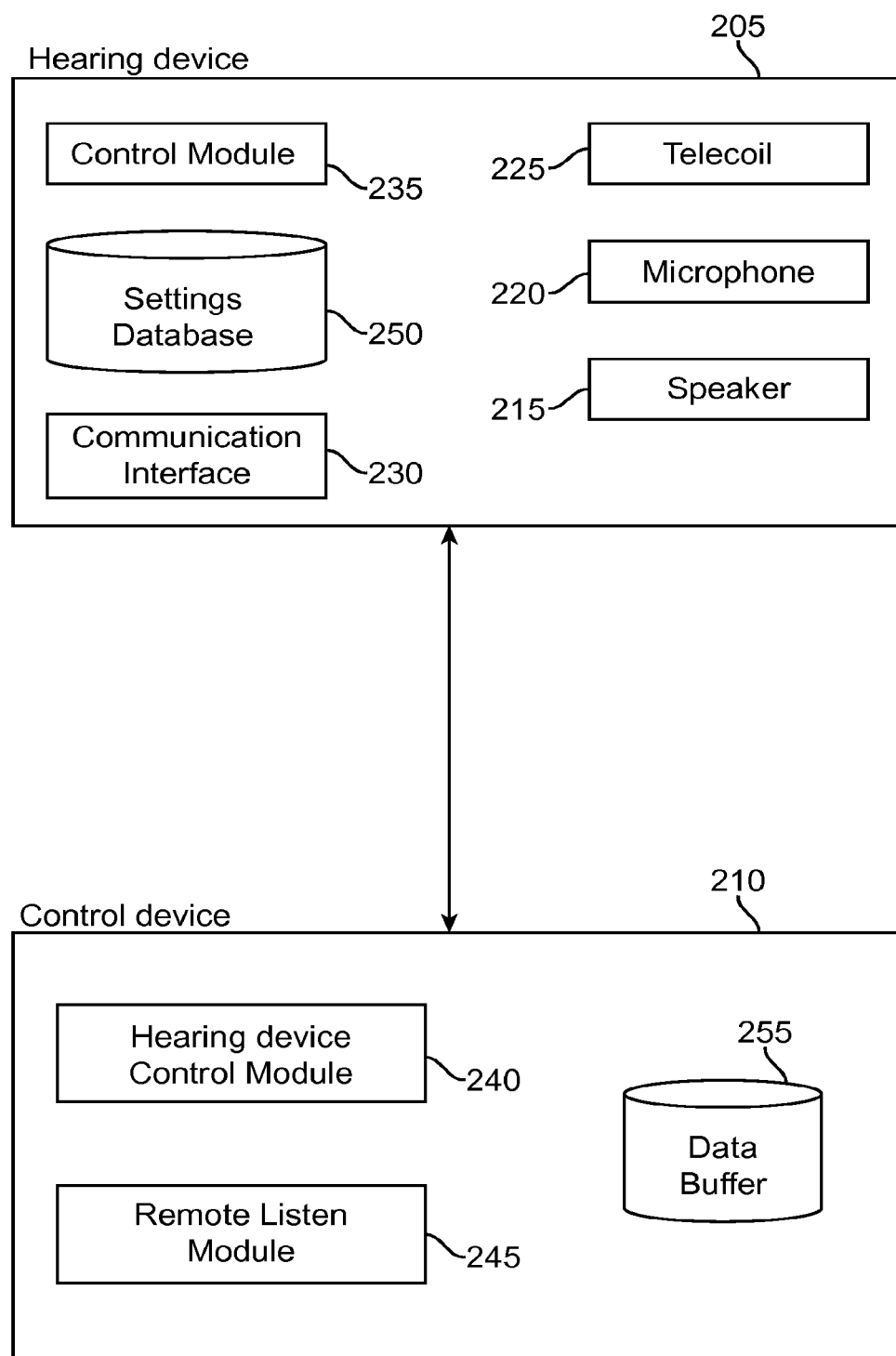
FIG. 2 illustrates an exemplary system embodiment in which multiple computing devices can be configured to wirelessly communicate with each other to transfer data.

Having disclosed some components of a computing system, the disclosure now turns to FIG. 2, which illustrates an exemplary system embodiment in which computing devices can be configured to wirelessly communicate with other computing devices to transfer data. A computing device can be any type of general computing device capable of network communication with other computing devices. For example, the computing device can be a personal computing device such as a desktop or workstation, a business server, or a portable computing device, such as a laptop, hearing device, smart phone, or a post-pc device. The computing device can include some or all of the features, components, and peripherals of computing device 100 of FIG. 1.

To facilitate communication with other computing devices, the computing device can also include a communication interface configured to receive a communication, such as a request, data, etc., from another computing device in communication with the computing device and pass the communication along to an appropriate module running on the computing device. The communication interface can also be configured to send a communication to another computing device in communication with the computing device. For example, in some embodiments, a computing device can be configured to communicate with other computing devices using an established transmission protocol such as Bluetooth® or other similar type of communications standard or protocol.

FIG. 2 illustrates two computing devices, e.g., a hearing device 205 and a control device 210, wirelessly communicating with each other to send and receive data. For example, the hearing device 205 and control device 210 can be communicating using an established transmission protocol such as Bluetooth® or other similar type of communications standard.

The hearing device 205 can be a computing device capable of receiving audio data and outputting the received audio data to a loudspeaker to aid in hearing. Audio data can be any type of data used to represent sound and can be sent alone or in combination with other data such as image or video data.

The hearing device 205 can be configured to receive audio data from multiple audio data sources such as a microphone, a streaming service, a computing device connected to the hearing device, etc. For example, the hearing device 205 can include a microphone 220 for capturing sound and converting it into audio data. In some embodiments, the microphone 220 can be an omnidirectional microphone configured to amplify sound equally from all directions. In some embodiments, the microphone 220 can be a directional microphone configured to amplify sound received from one direction more than sound received from other directions. In some embodiments, the microphone 220 can be an adaptive directional microphone configured to vary the direction of maximum amplification. In some embodiments, the microphone 220 can include multiple microphones including a combination of different types of microphones.

The hearing device 205 can also include a telecoil 225 configured to allow audio data sources to be directly connected to the hearing device 205 to stream audio data directly to the hearing device 205. For example, the telecoil 225 can be an audio induction loop configured to receive audio data from multiple audio data sources such as telephones, Frequency Modulation (FM) systems, induction loop systems that transmit sound, etc.

The hearing device 205 can also be configured to receive audio data from other computing devices via a communication interface 230 using an established transmission protocol such as Bluetooth® or other similar type of communications standard.

The hearing device 205 can also receive audio data from a Direct Audio Input (DAI) (not shown) connected to an external audio source.

Received audio can be output as sound via a loudspeaker 215 included in the hearing device 205. It is noted that loudspeaker 215 may include separate loudspeakers for each ear of a user.

The hearing device 205 can also include a control module 235 configured to control settings of the hearing device. For example, the control module 235 can be configured to control the volume of the loudspeaker 215, the volume of each audio data source, sound settings such as treble, bass, balance, etc., which audio data source or group of audio data sources to receive audio data from, which type of microphone 220 to enable, the sensitivity of each microphone 220, the direction of a direction or adaptive directional microphone, the type of stream to receive audio data from, etc.

The hearing device 205 can also include a settings database 250 configured to store settings data including the currently selected settings as well as stored program settings. The stored program settings can include settings data chosen to be optimal in different environments. For example, a stored program can be set for outdoors and adjust the settings to take into account that sound will be coming from multiple locations whereas a stored program for indoors can set the settings to focus on hearing sound from one direction. These are just two possible embodiments and are not meant to be limiting. One skilled in the art will recognize that any number of stored programs can be included that adjust the settings accordingly taking into account any number of factors.

The control module 235 can be configured to receive setting commands to change settings of the hearing device 205, either to change individual settings or to select a stored program setting. In some embodiments, the control module 235 can receive setting commands from an input interface built into the hearing device 205 such as a touch-sensitive display, buttons, switches, dials, microphone, etc. For example, the hearing device 205 can include a button configured to send a setting command to the control module 235 to increase the volume of the speaker 215 or a button configured to send a setting command to the control module 235 to toggle between the different audio data sources or stored program settings.

In some embodiments, the control module 235 can be configured to receive setting commands from a computing device in communication with the hearing device via the communication interface 230. For example, the hearing device 205 can receive commands from the control device 210 which is communicating with the hearing device 205 using an established transmission protocol such as Bluetooth® or other similar type of communications standard. Upon receiving a setting command from the control device 210, the control module 235 can be configured to adjust the settings of the hearing device accordingly and store the settings in the settings database 250.

In addition to receiving commands from the control device 210, the control module 235 can also be configured to send status data to the control device 210. Status data can include any information regarding the hearing device such as the current settings of the hearing device 205, the different stored program settings saved in the settings database 250, the remaining battery life of the hearing device 205, the manufacturer and model of the hearing device 205, available audio data sources of the hearing device 205, software version running on the hearing device 205, etc.

The control device 210 can include a Hearing Device Control (HDC) module 240 configured to search for and connect to an available hearing device 205, request and receive status data from the hearing device 205 as well as send settings commands to the hearing device 205. For example, the HDC module 240 can be configured to search for available hearing devices 205 using an established transmission protocol such as Bluetooth® or other similar type of communications standard and present the available devices to a display of an interface configured to receive selection. For example, the available hearing devices 205 can be presented by an interface and listed according to distance so that the available hearing devices 205 closest to the control device 205 are listed first. The interface can be further configured to receive an input command selecting which of the available hearing devices 205 to which the control device 210 should connect. For example, the control device 210 can include a touch screen configured to receive an input command selecting one of the available hearing devices 205. A touch screen is just one possible embodiment and not meant to be limiting. One skilled in the art would recognize that any known input can be used to select an available hearing device.

The HDC module 240 can be configured to connect to an available hearing device 205 using an established transmission protocol such as Bluetooth® or other similar type of communications standard. As well known, in the Bluetooth protocol, the control device 210 would "pair" with the hearing device 205 through an exchange of authentication data including unique identification data of each device.

The HDC module 240 can also be configured to request and receive status data from the hearing device 205 connected to the control device 210 and present the received status data on the control device 210. For example, the HDC module 240 can be configured to present the status data in a settings interface on a display of the control device 210.

In addition to presenting the status data, HDC module 240 can also configure the settings interface to receive input commands indicating changes to the settings and to send a command to the hearing device 205 to change the settings accordingly. For example, the settings interface can receive input commands selecting new settings which the HDC module 240 uses to create a command and then sends the command to the hearing device 205 which is used by the control module 235 of the hearing device 205 to change the settings accordingly.

The HDC module 240 can configure the settings interface to present the status data and receive input to change settings in any number of ways, embodiments of which will be described in further detail below.

The HDC module 240 can also be configured to initiate a quick mode wherein a command to change the settings of a connected hearing device can be performed in a streamlined manner consisting of fewer steps and selections. In some embodiments, this can include presenting the settings interface on the control device 210 in fewer steps. For example, the HDC module 240 can be configured to present the settings interface upon receiving an input or combination of inputs from a button or other external input of the control device 210. For example, in some embodiments, quick mode may be initialized upon an external button being pressed three times within a specific time period. The HDC module 240 can be configured to monitor selection of input on the control device 210 and initialize quick mode upon receiving the correct input or combination of input, and display the settings interface. A user can thus quickly tap a button on the control device 210 three times to initialize quick mode and bring up the settings interface. Although the example of selecting a button three times is used, this is just one possible embodiment and is not meant to be limiting.

When initialized in quick mode the settings interface can combine related settings and present them as one setting as well as provide one interface to change the settings for both related settings. For example, the volume control for multiple speakers can be combined into one master volume command rather than presented individually. Thus the volume for multiple speakers can be changed upon changing one setting rather than changing each individually.

Quick mode can also override select buttons of the control device 210 to be configured to adjust the settings of the hearing device 205. For example, when in quick mode, the HDC module 240 can be configured to override a volume button associated with the control device 210 to adjust the volume of the hearing device 205 rather than the volume of the control device 210. The volume of the hearing device 205 can thus be easily changed by pressing an external button of the control device 210 and does not require using the settings interface.

The HDC module 240 can be configured to terminate quick mode in any number of ways. For example, in some embodiments quick mode terminates upon a predetermined amount of time elapsing with no input. In some embodiments, quick mode terminates upon the setting interface being closed. In some embodiments, quick mode can be terminated upon receiving a specific input on a button of the control device 210, similar to selecting a button three times as can be done to initialize quick mode. These are just possible embodiments and are not meant to be limiting.

In some embodiments, the HDC module 240 can be configured to automatically send a command to the hearing device 205 to change the setting of the hearing device 205. In some embodiments, the HDC module 240 can be configured to automatically send a command to change the settings of the hearing device 205 based on the environment of the hearing device 205. The environment of the hearing device 205 can be determined in numerous ways. For example, it can be based on the location of the control device 210, which is assumed to be in a similar environment as the hearing device 205. The HDC module 240 can be configured to determine the location of the control device 210 and determine a stored program setting that is best optimized for the environment associated with the location. For example, the HDC module 240 can send a command to the hearing device 205 to change the settings to a stored program setting for theaters upon a determination that the control device is located in a theater. Alternatively, the HDC module 240 can send a command to change the settings to a stored program setting for a vehicle upon a determination that the control device 210 is in a vehicle.

The HDC module 240 can determine the location of the control device 210 in numerous ways. For example, in some embodiments, HDC module 240 can receive location data from a GPS module included in the control device and configured to receive location data from a GPS satellite. The HDC module 240 can match the location data to map data to determine the environment of the location, for example if the location is a restaurant, stadium, house, etc.

In some embodiments, the HDC module 240 can be configured to determine the environment of the hearing device 205 based on a network connection or other device connected to the control device 210. For example, HDC module 240 can determine that the environment is a vehicle upon a determination that the control device 210 is connected to communicate with a computing device of the vehicle using an established transmission protocol such as Bluetooth® or other similar type of communications standard. In some embodiments, the HDC module 240 can determine the environment based on data from a network connection of the control device 210. For example, the network connection can indicate that the network access provider is a library, school, restaurant, etc.

In some embodiments, the hearing device 205 can be configured to monitor for specific sounds and alert the user upon detection of the specific sound. For example, the hearing device 205 can be configured to detect a door bell and provide the user with a notification that the sound was received. A method for providing a notification in this type of manner is disclosed in U.S. patent application Ser. No. 13/029,849 filed on Feb. 17, 2011, which is hereby expressly incorporated by reference in its entirety. The HDC module 240 can be configured to change settings for this functionality based on the determined environment of the user. For example, the HDC module 240 can be configured to set the hearing device 205 to monitor for sirens when it is determined that the user is in a car. Alternatively, the HDC module 240 can be configured to set the hearing device 205 to monitor for the doorbell when it is determined that the user is at home.

The HDC module 240 can also be configured to initiate a remote listen mode. The control device 210 can include a remote listen module 245 configured to set the control device 210 to be the audio data source for the hearing device 205 and receive and transmit audio data to the hearing device 205. For example, the remote listen module 245 can receive audio data from a microphone connected to the control device 210 and transmit the audio data to the hearing device 205. In some embodiments, the microphone can be an integral microphone incorporated into the control device 210, in some embodiments the microphone can be an external microphone connected to the control device 210 wirelessly or through a wired connection. A user can thus initiate remote listen mode and place the microphone in a desired location and hear the captured sound on the hearing device 205. This can be useful in numerous settings such as in a large classroom or lecture hall. A user can place the microphone at the front of the room and clearly hear the audio even when seated in the back of the room.

In some embodiments, remote listen mode can further be configured to translate the received speech into text which can be displayed on a display of the control device 210. A user using remote listen mode in a classroom can thus receive text of the lecture as well as the audio. Further, in some embodiments, the user can configure the control device 210 to transmit the converted text to another computing device for display. For example, the control device 210 can be connected to a user's laptop and the text can be displayed on the laptop. This would be advantageous in a situation when a user is listening to a lecture and taking notes. The user could thus read the text of the audio on the same device that the user is using to write notes. One method of converting speech to text is disclosed in U.S. patent application Ser. No. 13/032,525, filed on Feb. 22, 2011, which is hereby expressly incorporated by reference in its entirety.

The control device can also include a data buffer 255. The data buffer 255 can be a database or memory configured to store audio data. For example, the data buffer 255 can be configured to store audio data received from a microphone connected to the control device 210 when the control device 210 is in remote listen mode. The remote listen module 245 can thus use the stored audio data to enable a user to manipulate transmission of the audio data to the hearing device. For example, the user can rewind or pause the transmission. The audio data stored in the data buffer 255 can be limited to a predetermined length. For example, the data buffer 255 can be configured to hold up to five minutes of audio data and erase all data that is older than five minutes. In some embodiments, the data buffer 255 can be configured to not limit the amount of audio data stored.

Figure 3A:
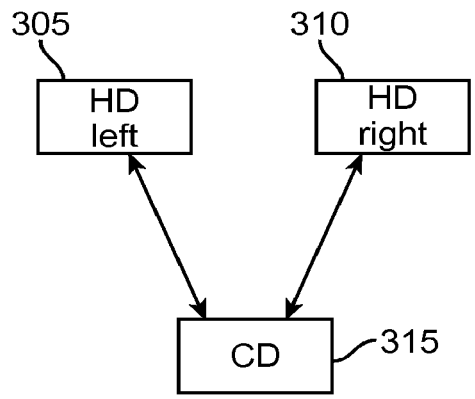
FIGS. 3a, 3b and 3c illustrate other possible system embodiments of a hearing device connected to a control device.
Figure 3B:
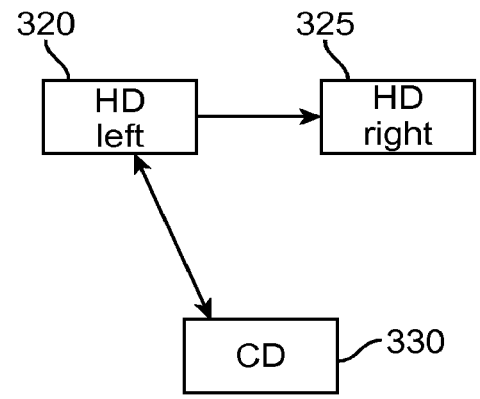
Figure 3C:
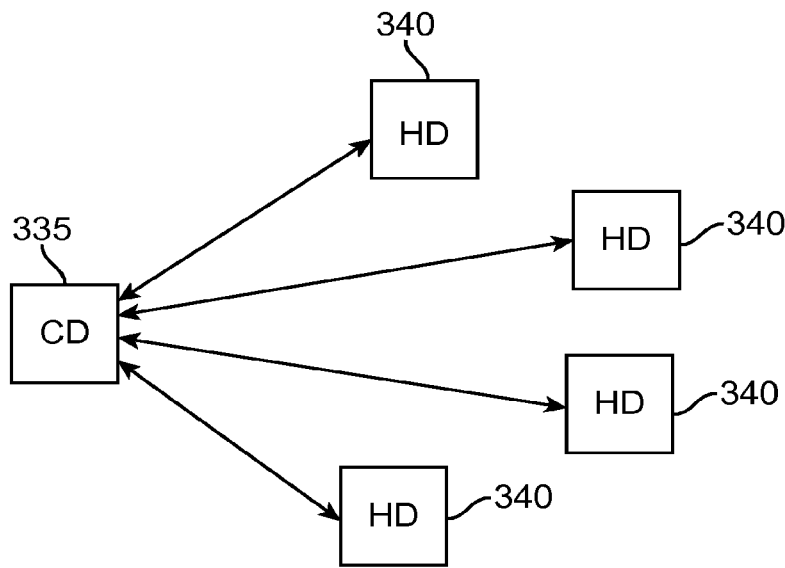

FIGS. 3a, 3b and 3c illustrate other possible system embodiments of a hearing device connected to a control device. FIG. 2 illustrates only one hearing device connected to one control device, however in some embodiments, a hearing device can be a hearing aid and is actually two devices, one for the left ear and one for the right. FIGS. 3a and 3b illustrate possible configurations of a control device connected to a left and right hearing device.

As illustrated in FIG. 3a, both a left hearing device 305 and a right hearing device 310 can be connected to a control device 315 using an established transmission protocol such as Bluetooth® or other similar type of communications standard. Although two devices 305, 310 are connected to the control device 315, the control device 315 can be configured to present status data from both hearing devices 305, 310 in one settings interface and thus allow settings of both hearing devices 305, 310 to be adjusted from the single settings interface. The interface can present setting controls of the two hearing devices 305, 310 separately or as one control that changes settings of both. Upon receiving input to change settings of the two hearing devices 305, 310, the control device can send a command to each hearing device separately to change the settings on that device. For example, if the settings for only the left hearing device 305 are changed, the control device 315 can send a command to only the left hearing device 305. Alternatively, if the setting for both the left 305 and right hearing device 310 are changed, the control device 315 can send a separate command to each to change the settings.

FIG. 3b illustrates a different exemplary embodiment in which a left hearing device 320 and right hearing device 325 are connected to a control device 330. As illustrated, only the left hearing device 320 is connected to the control device 330 using an established transmission protocol such as Bluetooth® or other similar type of communications standard. In this embodiment, the left hearing device 320 can be a master hearing device configured to communicate with both the right hearing device 325 and the control device and act as an intermediary between the two. The left hearing device 320 can be configured to send status data about both hearing devices 320, 325 to the control device 330 and send any command received from the control device 330 regarding the right hearing device 325 to the right hearing device 325. In yet another embodiment, all of the functional components of the hearing device may be incorporated into one hearing device 320, while the hearing device 325 would contain only a loudspeaker and a data communication interface (either wired or wireless) for communication of audio data from the hearing device 320.

FIG. 3c illustrates an exemplary embodiment in which multiple hearing devices 340 are connected to a single command device 335. This type of embodiment can be useful when remote listen mode is initiated. For example, an instructor can place his/her computing device at the front of the classroom as a control device 335 and allow the students to connect to it with their hearing devices 340 to receive audio data collected by a microphone connected to the control device 335. Alternatively, one student can place a control device 335 at the front of the classroom and allow the other students to connect to it.

In some embodiments, instead of multiple hearing devices connecting directly to one control device, multiple control devices, each associated with a single hearing device, can be connected to one computing device that is used to collect audio data and transmit the audio data to each control device. The control devices can be in remote listen mode and thus use the one computing device as an external microphone audio data source. This way one computing device can still be used to transmit audio data to multiple people but each person retains control over their own hearing device because it is connected to only their control device.

Figure 4:
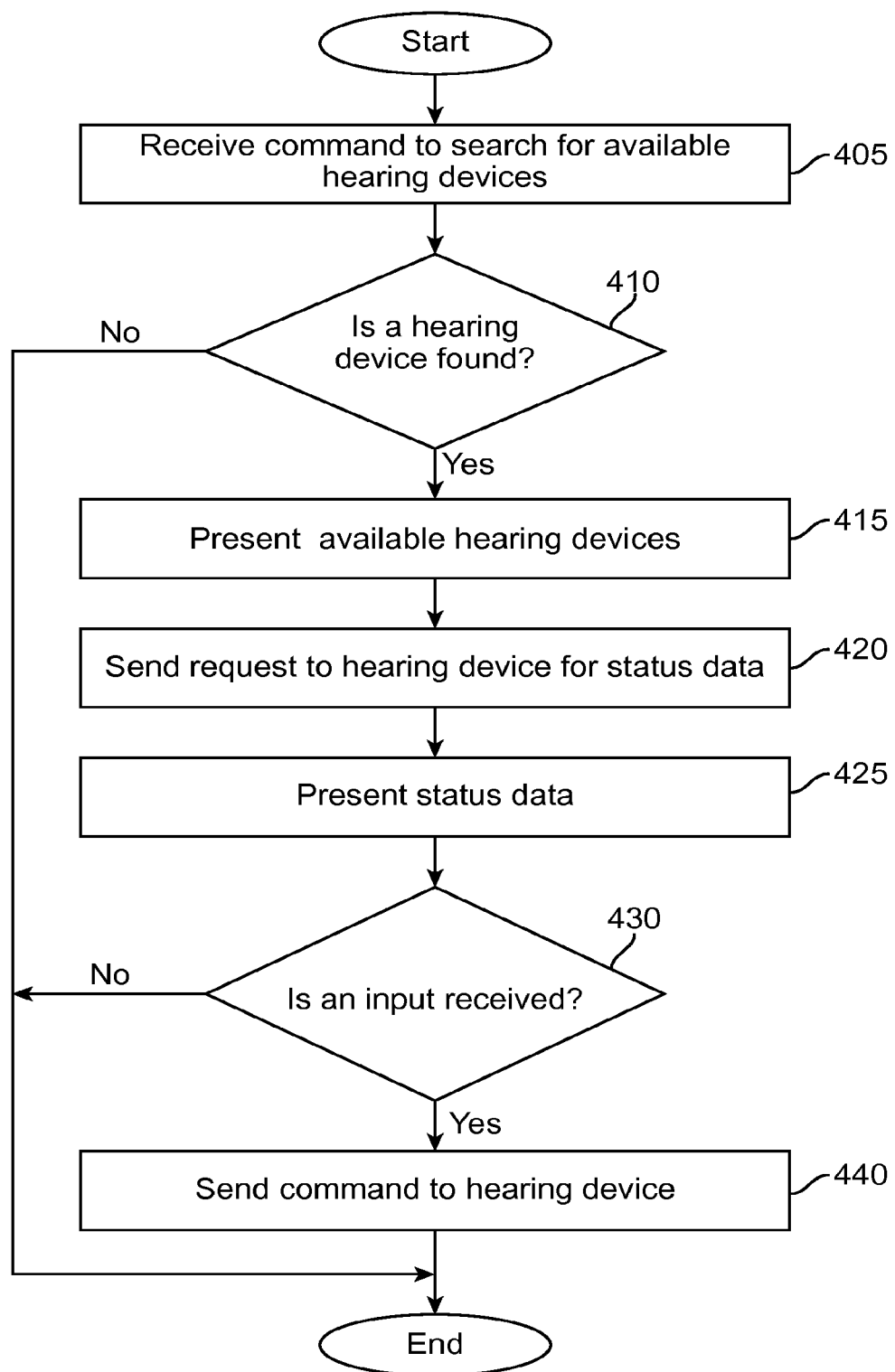
FIG. 4 illustrates an exemplary embodiment of a method of controlling a hearing device from a control device.

FIG. 4 illustrates an exemplary embodiment of a method of controlling a hearing device from a control device. As illustrated, the method beings at block 405 when a command is received at the control device to connect to a hearing device. The control device can then search available devices using an established transmission protocol such as Bluetooth® or other similar type of communications standard to attempt find any available hearing devices 410.

If no hearing devices are found, the method ends. If a hearing device is found, the method continues to block 415 wherein the available hearing devices are presented 415 on the control device, for example in an interface and listed based on distance to the control device. The interface can also be configured to receive an input to select one of the available hearing devices and connect to a selected hearing device.

Once connected, the control device next sends a request to the hearing device for status data 420 and then presents the status data 425 in a settings interface on the control device. In addition to presenting the status data, the settings interface can also be configured to receive input to change a setting on the hearing device. The method thus determines whether an input to change the settings has been received 430, and if so sends a command to the hearing device 435 to change the settings according to the received input. If an input is not received, the method ends.

Figure 5:
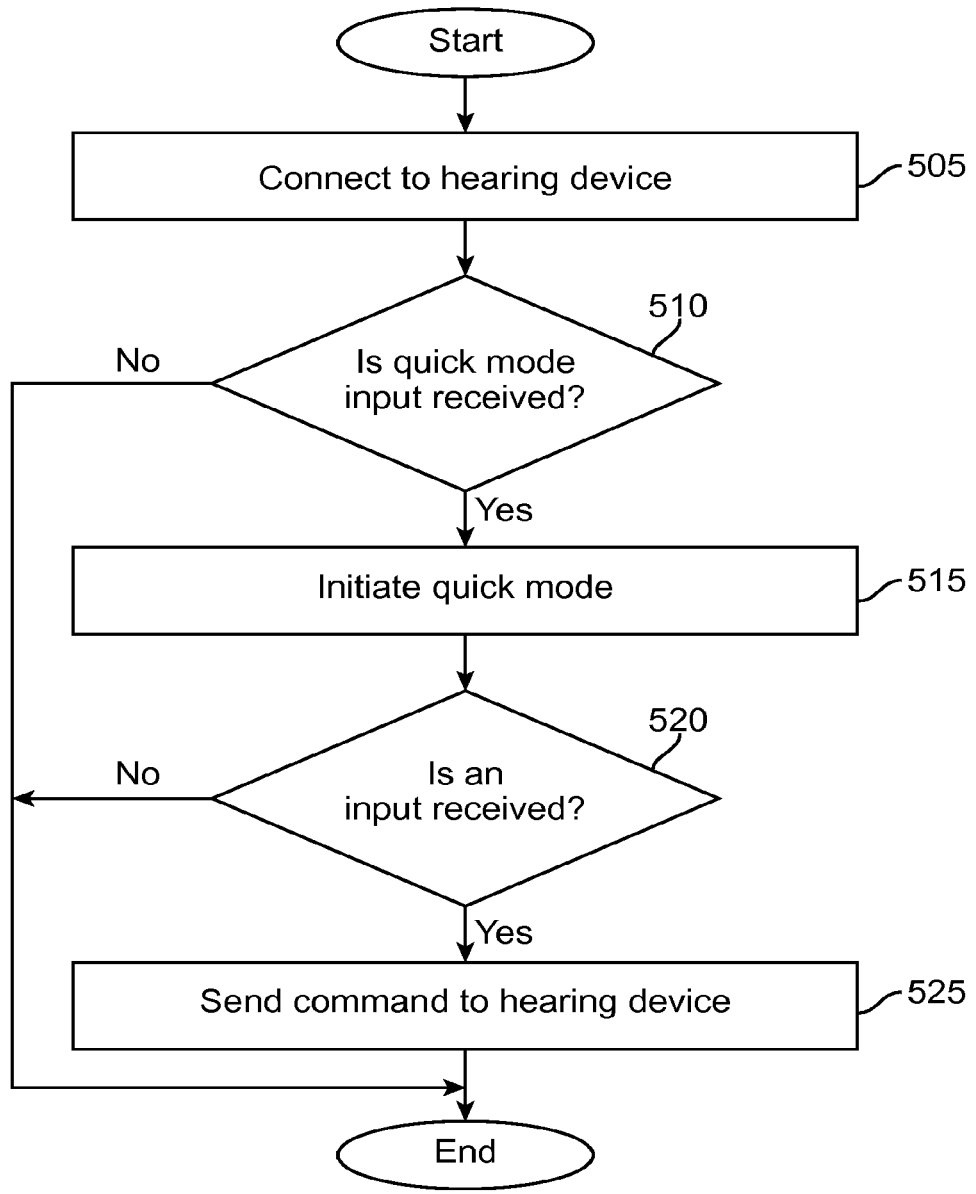
FIG. 5 illustrates an exemplary method embodiment of initiating quick mode on the control device.

FIG. 5 illustrates an exemplary method embodiment of initiating quick mode on the control device. As illustrated, the method begins at block 505 where the control device connects to a hearing device using an established transmission protocol such as Bluetooth® or other similar type of communications standard. Upon successfully connecting to a hearing device 505, the control device determines whether an input to initiate quick mode has been received 510. For example, a module running on the control device can monitor input components of the control device, such as buttons, to determine whether they have been selected. The module can be configured to determine that a quick mode input has been received upon a special or unique selection of the input being received. For example, in some embodiments, the module can determine that a quick mode input has been received upon a specified button being selected three times within a specified time period.

If it is determined that a quick mode input is received, the control device can initiate quick mode on the control device 515. Initiating quick mode can include presenting the settings interface on the control device. In some embodiments, the settings interface presented while in quick mode can be configured to present status data and receive changes to settings in a simpler format. For example, in embodiments where the hearing device includes a left and right hearing device, the volume of the two hearing devices can be presented as one volume and can be controlled by one presented input.

In some embodiments, the control device can determine whether to present the volume of the left and right hearing device as one input or two separate inputs. For example, the control device can make the determination based on whether the currently set volume levels of the left and right hearing device are within a predetermined range of each other. If within the range, the volume for the two can be presented as one, and if not within the range, the volume for each can be presented separately. In some embodiments, the range can be set to be a small difference, such as within 5% of each other, to determine that the two volumes are set at roughly the same volume. When presenting the two volumes as one, the settings interface can be configured to receive one input to change both volumes and keep the volumes the same distance apart when adjusting the volume. Therefore, if the volume of the left hearing aid was set higher than the volume of the right hearing aid, the volume of the left hearing aid would remain the same difference higher upon changing the volume of both with one interface.

Initiating quick mode 515 can also cause external buttons of the control device to be reconfigured to control settings of the hearing device. For example, when quick mode is initiated 515, an external volume button of the control device can be configured to adjust volume controls of the hearing device. In embodiments in which a left and right hearing device are connected to the control device, the external button can be configured to adjust the volume on both devices equally.

Once quick mode is initiated, the method continues to block 520 and determines whether an input is received. If an input is received, the control device sends a command to the hearing device 525 to adjust the settings accordingly. If an input is not received, the method ends.

Figure 6:
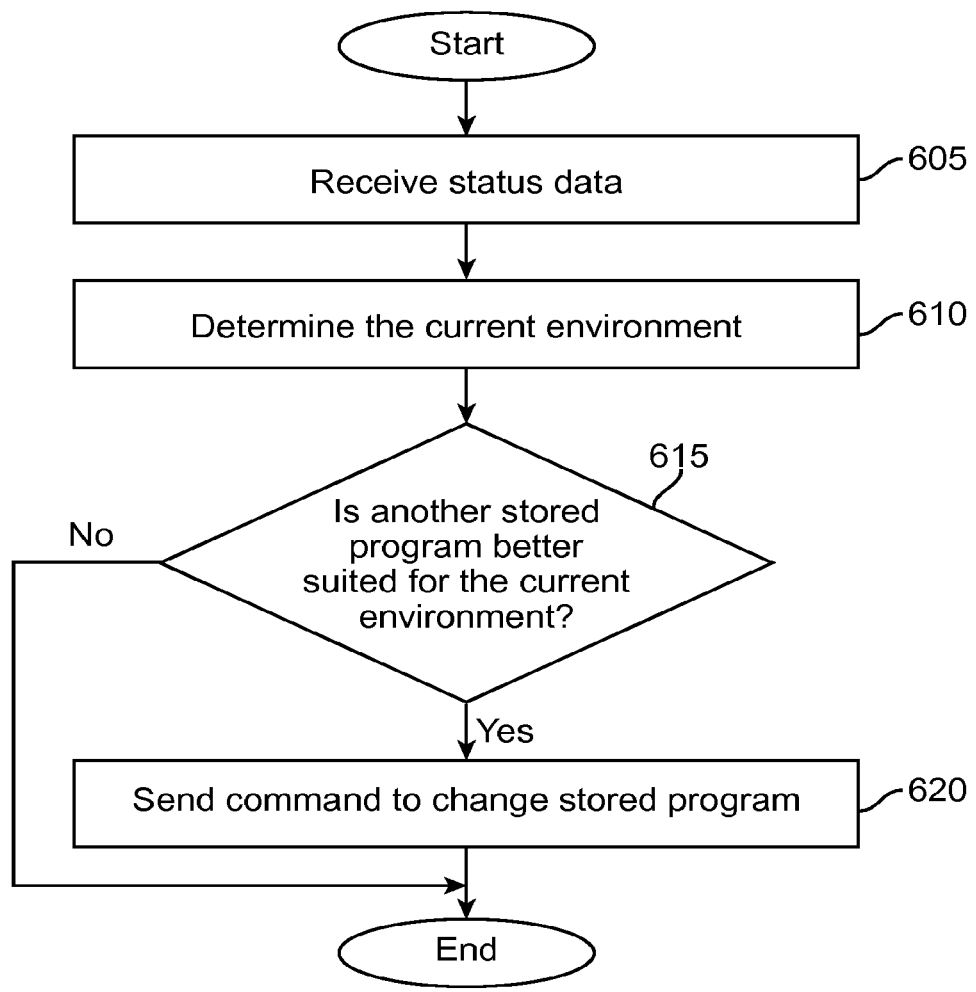
FIG. 6 illustrates an exemplary method embodiment of changing the settings of the hearing device based on the determined current environment.

FIG. 6 illustrates an exemplary method embodiment of changing the settings of the hearing device based on the determined current environment. The method begins at block 605 where status data is received at the command device that indicates the stored program currently enabled on the hearing device as well as all of the other stored programs that are available. Each stored program can be optimized to perform best in a particular environment. For example, a program can be optimized for an environment such as a theater, car, concert, restaurant, party, etc.

Once the status data has been received, the method next determines the current environment 610 of the hearing device. This can be determined in numerous ways. For example, the environment of the hearing device can be assumed from the location of the control device connected to the hearing device. For example, the control device can include a GPS module configured to communicate with a satellite to receive GPS location data so as to compute the geographical location of the control device. The GPS location data can be used along with map data to determine the environment of the determined location. For example, the map data can indicate that the given location is a stadium or theatre and the environment can be determined to be a theater. Alternatively, based on the map data, the location can be determined to be a restaurant and the environment can be determined to be a restaurant.

In some embodiments, the current environment can be determined 610 based on data from another computing device that is connected to the control device. For example, if it is determined that the control device is connected to a car's computing device, the environment of the hearing device can be determined to be in a car.

The method next determines whether one of the other stored programs is better suited for the current environment than the currently enabled stored program 615. This can be done in any number of ways. For example, the previously stored programs can all be associated with metadata identifying the type or types of environments that they are best suited for. In some embodiments, the metadata can include a grade or ranking indicating how well the stored program is suited for multiple environments. The control device can compare the determined environment against the metadata associated with each stored program to determine a ranking. If one of the other stored programs is ranked higher it is determined to be a better fit and the method continues to block 620 where the device transmits a command to the hearing device to change the currently enabled stored program to the other stored program 620 determined to be better suited for the current environment. If the currently enabled environment if ranked highest, it is determined that no other stored program is better suited and the method ends.

Figure 7:
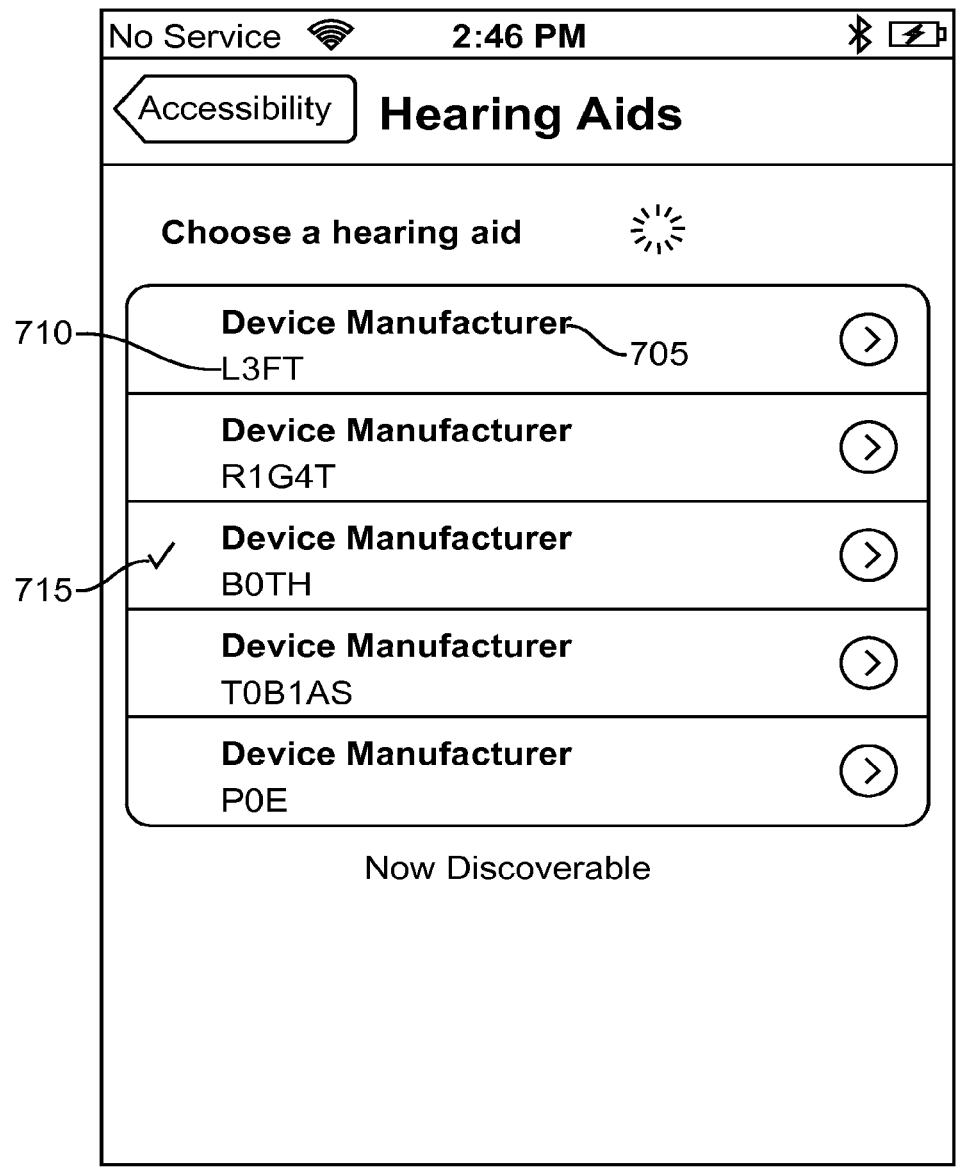
FIG. 7 illustrates a screenshot of an exemplary embodiments of an interface to connect the control device to a hearing device.

FIG. 7 illustrates a screenshot of an exemplary embodiment of an interface to connect the control device to a hearing device. As illustrated, upon discovering hearing aids, the control device can list them in an interface. In some embodiments, the hearing devices can be listed according to distance from the control device. For example, the closest hearing device can be listed first and the farther hearing device can be listed last.

Each hearing device listed can be identified by a name. For example, as illustrated, each hearing device is identified by a manufacturer 705 and model 710. This is just one exemplary embodiment and is not meant to be limiting. Any identifying data can be presented with the located hearing devices.

The interface can be configured to receive a selection indicating the identified hearing device to which the control device should connect. For example, the hearing device can include a touch screen configured to receive the selection. The interface can also include a visual indicator 715 identifying hearing devices currently connected to the control device. As illustrated the visual indicator 715 is a check mark indicating the associated hearing device is presently connected to the control device.

Figure 8A:
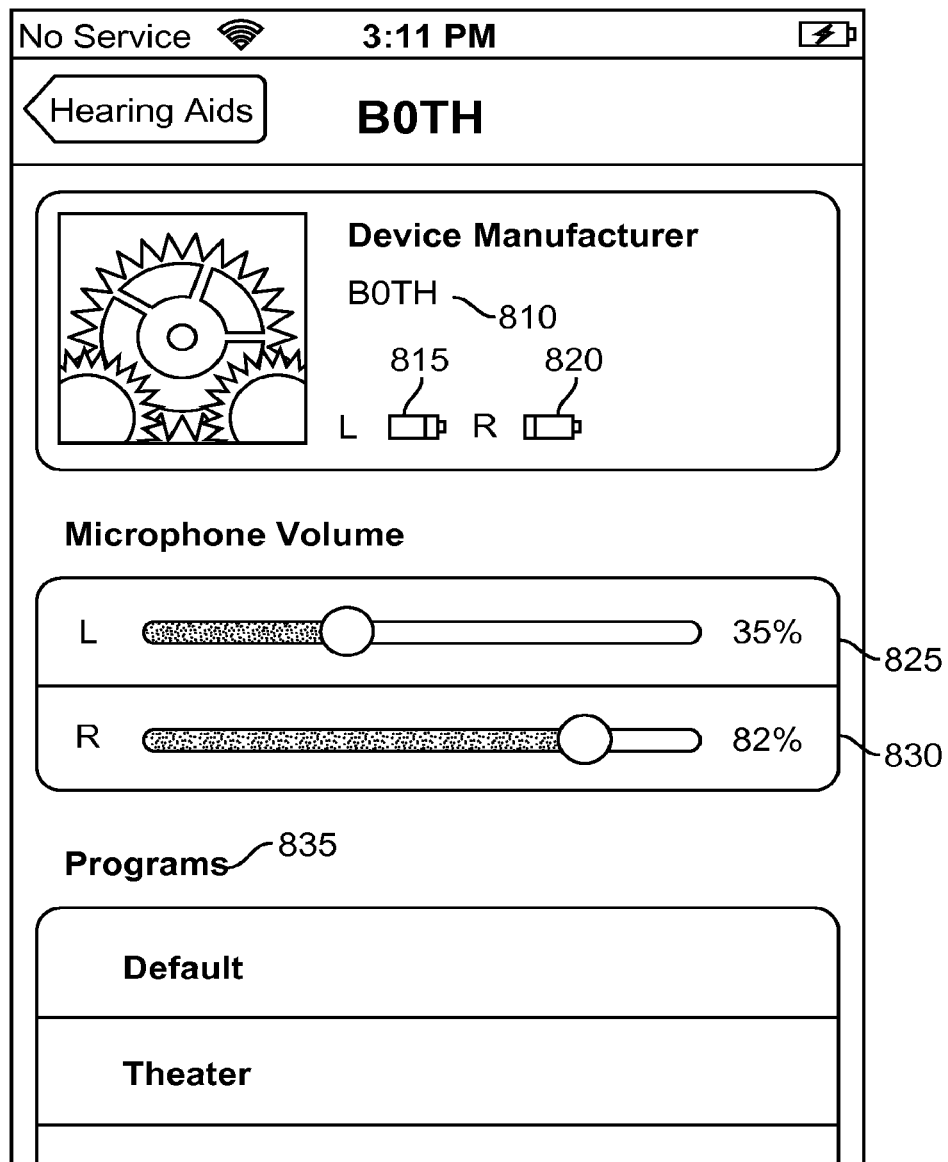
FIGS. 8a and 8b illustrate screenshots of an exemplary embodiment of the settings interface.
Figure 8B:
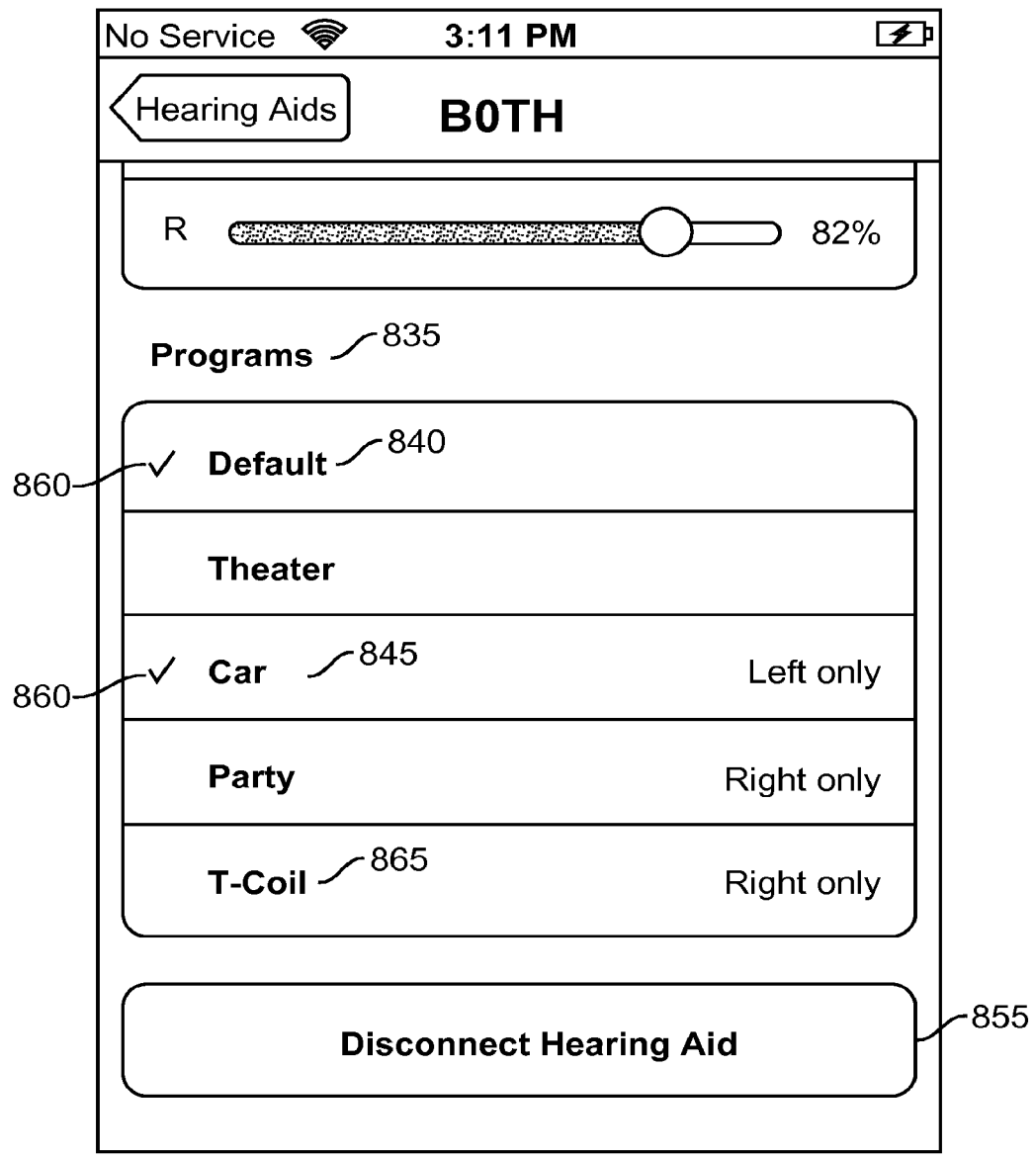

FIGS. 8*a* and 8*b* illustrate a screenshot of an exemplary embodiment of the settings interface. As illustrated in FIG. 8*a*, the settings interface can include information identifying the connected hearing device. For example, the manufacturer 805 and model 810 of the hearing device can be displayed. The information identifying the connected hearing device can be received as part of the status data from the hearing device.

In addition, the settings interface can include microphone volume controls 825 830. As illustrated, the connected hearing device includes a left 825 and right 830 hearing device and microphone volume controls for both are displayed. Further, the microphone volume controls can include an indication of the current microphone volume level set for each as well as an input to change the setting for each. As illustrated the microphone volume for the left hearing device 825 is currently set at 35% and the microphone volume of the right hearing device 830 is currently set at 82%. The settings interface can include a sliding input to adjust the microphone volume settings for either the left 825 or right 830 microphone. The sliding interface can be configured to be dragged, for example, using a touch interface to adjust the volume.

Moving on to FIG. 8*b*, the setting interface can also include a programs 835 section configured to display available stored program settings and allow selection of a stored program setting. As illustrated, there are five stored program settings available. A visual indicator 860 such as a check mark indicates the currently selected programs 840, 845. Further a program can be set to both the left and right hearing device or a separate program can be set for each. Whether a program is configured to be set to both or one hearing device can be indicated by a text associated with the listed stored program setting. For example, the car program 845 is set to only the left hearing device as indicated by the text 850 associated with the car program 845. The T-coil program 865, however, is configured to be set to the right hearing device only as indicated by the associated text 870. The default program 840 has no text associated with it. This can indicate that the default program 840 is configured to apply to both the left and right hearing device.

As illustrated, the default program 840 and car program 845 are selected as indicated by the visual indicators 860. The default program 840 is configured to be set on both hearing devices while the car program 845 is configured to be set on only the left hearing device. In this type of embodiment, the program set to one ear can take priority over the program set to both hearing devices. Accordingly, the default program 840 can be set on only the right ear by setting the left ear to be set to another program, thus not requiring the default program 840 to be set to right only.

The settings interface can also include a button 855 configured to disconnect the hearing device from the control device. If the button is selected, the connection between the hearing device and control device can be broken.

Figure 9:
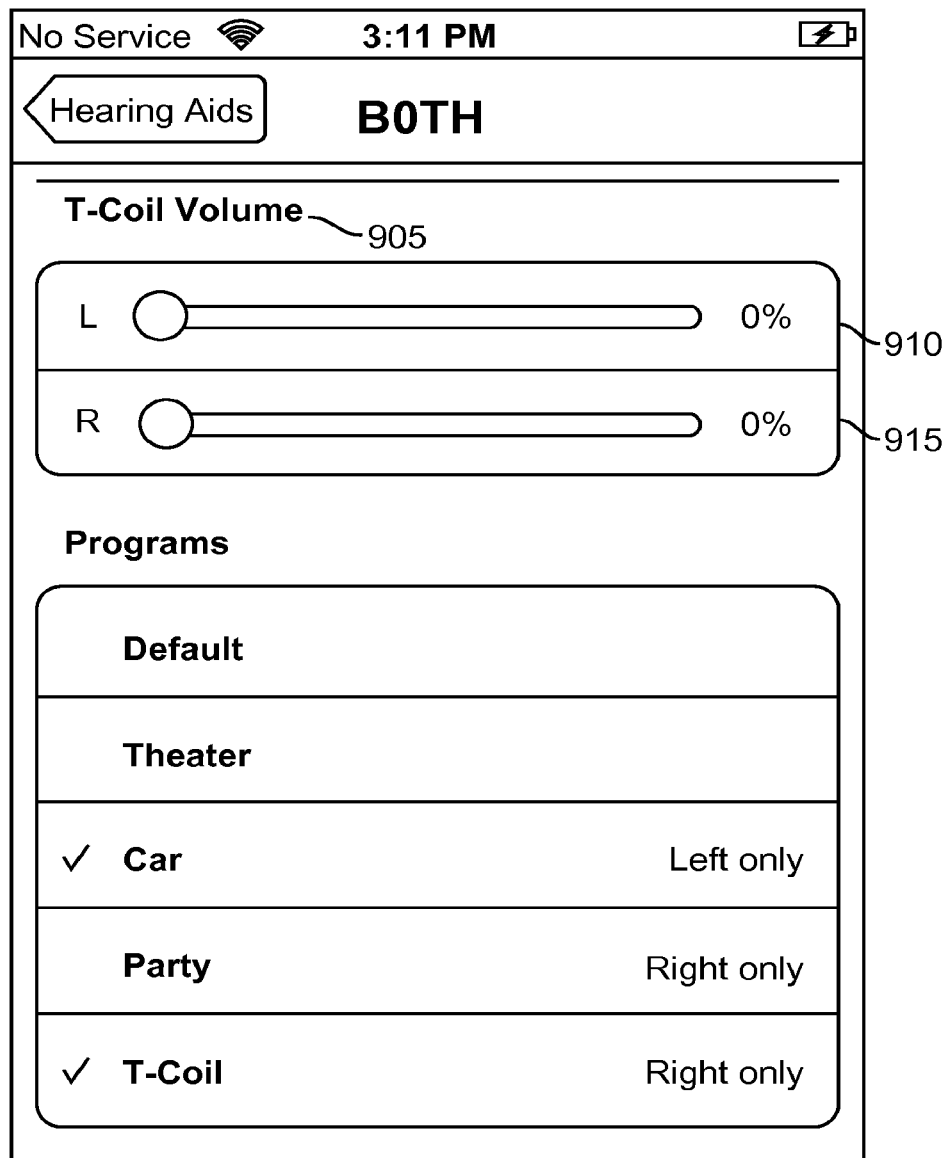
FIG. 9 illustrates a screenshot of an exemplary settings interface when the T-coil has been selected to be an audio data source.

Some programs, such as the T-coil program 865 can be configured to initiate further audio data sources, such as the telecoil 225 included in the hearing device. Selection of such a program can cause the settings database to initiate further controls. FIG. 9 illustrates a screenshot of an exemplary settings interface when the telecoil has been selected to be an audio data source. As illustrated, the T-coil program has been selected and a T-coil volume control 905 has been presented. As illustrated, the T-coil volume can be configured to adjust the T-coil volume of both the left 910 and right 915 hearing devices as well as to display the current volume of each. Similar to the microphone volume control discussed earlier, the T-coil volume can be adjusted using a sliding interface.

Figure 10A:
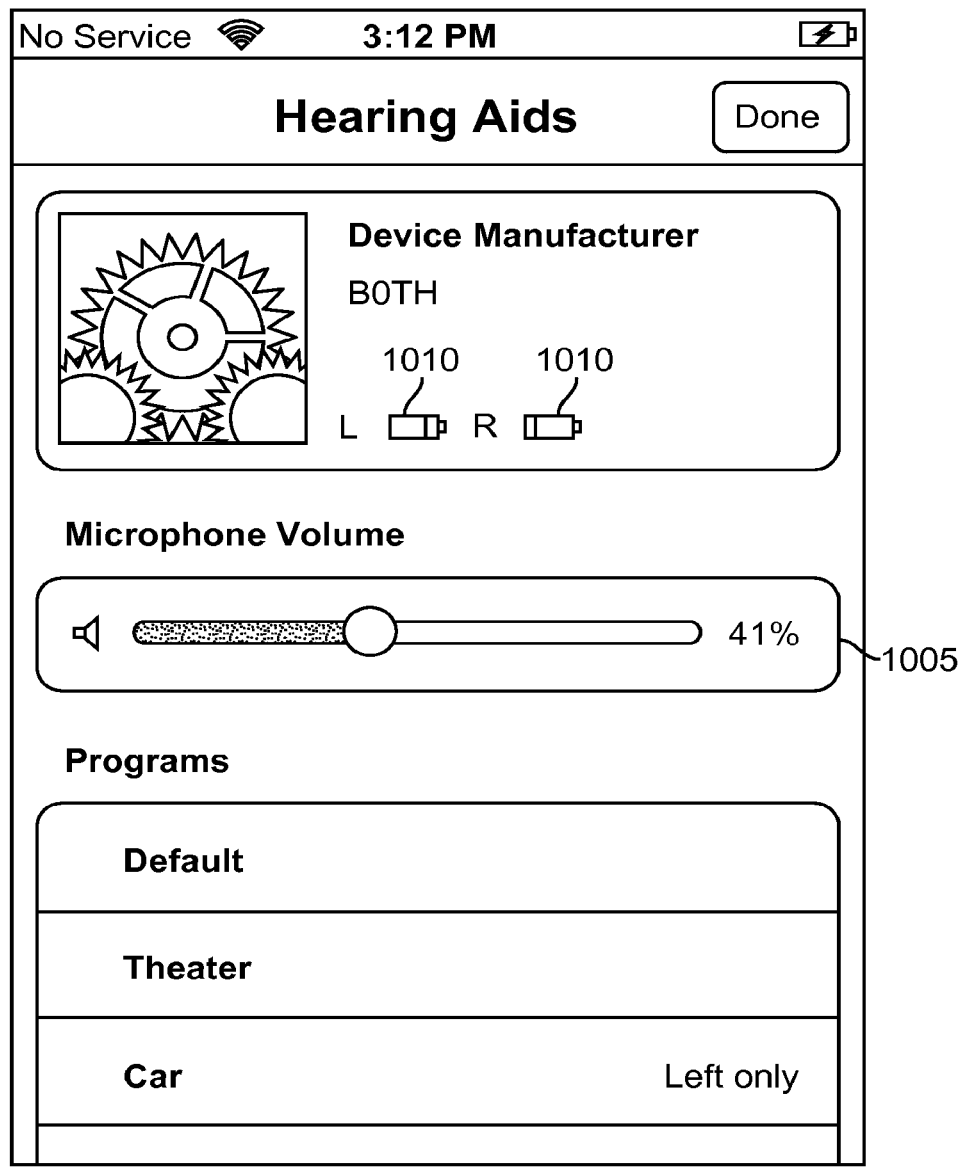
FIGS. 10a and 10b illustrate screenshots of exemplary embodiments of the settings interface when initiated in quick mode.
Figure 10B:
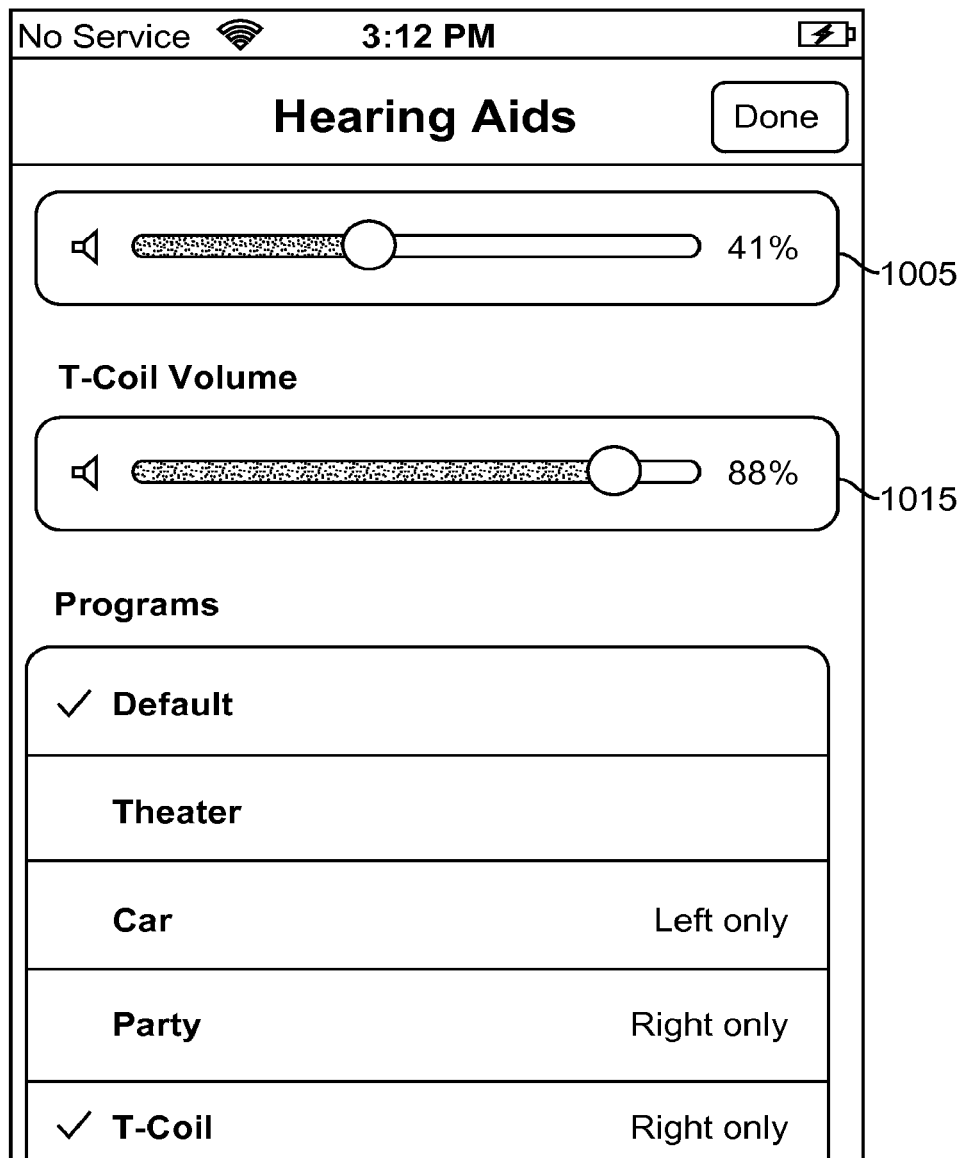

FIGS. 10a and 10b illustrate screenshots of exemplary embodiments of the settings interface when initiated in quick mode. As illustrated, two hearing devices, a left and a right, are connected to the control device as indicated by the remaining battery life indicator 1010 presented for each device; however only one microphone volume control 1005 is displayed including only one current microphone level. As discussed above, the microphone volume level of both devices can be adjusted using the one provided sliding interface.

FIG. 10b illustrates an embodiment of the setting interface initiated in quick mode when a telecoil is enabled as an audio data source. As illustrated a T-coil volume control 1015 can be included in addition to the microphone volume control 1005. The T-coil volume control 1015, like the microphone volume control 1005, can include a combined current T-coil volume level and sliding interface that adjusts the T-coil volume level for both the left and right hearing device.

Figure 11:
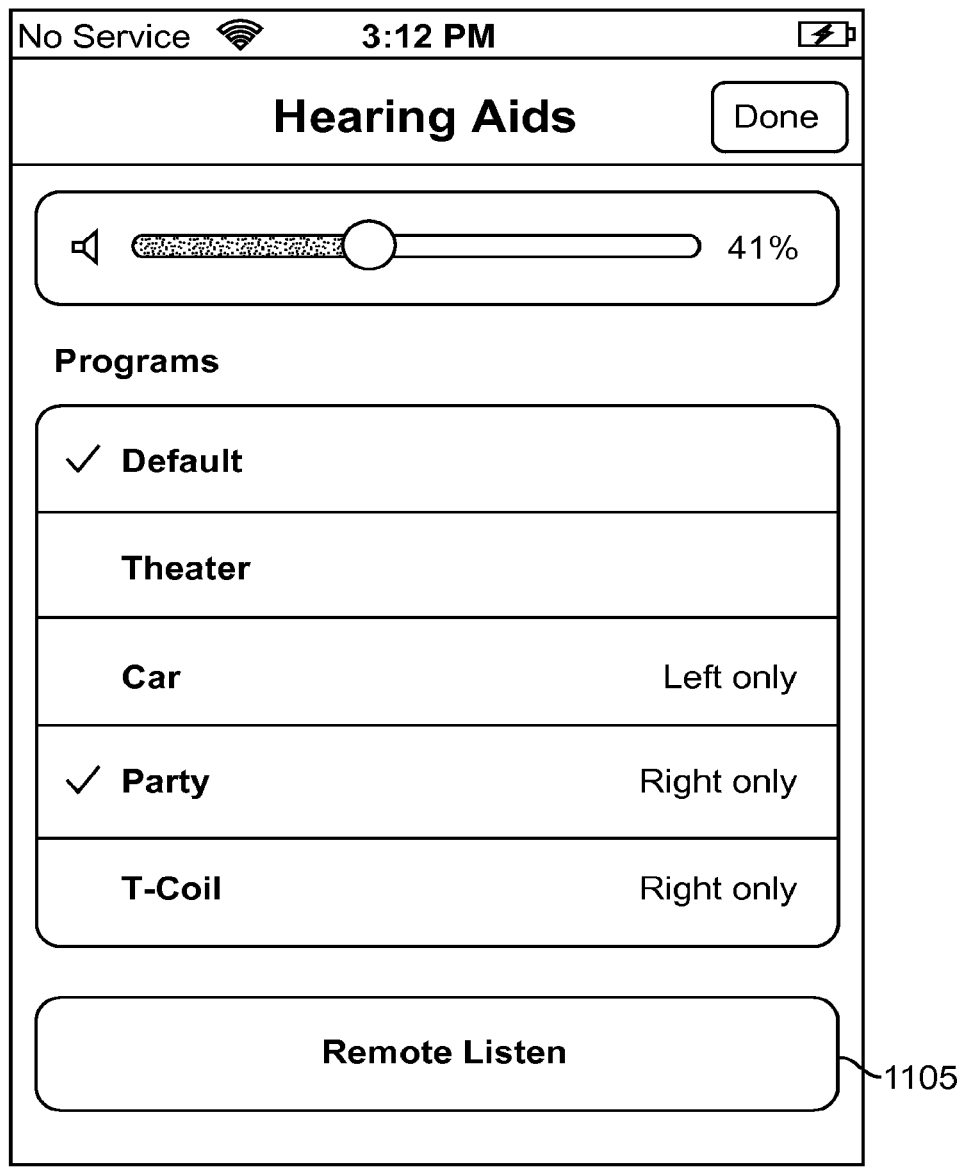
FIG. 11 illustrates a screenshot of an exemplary embodiment of the settings interface configured to initiate remote listen mode.

FIG. 11 illustrates a screenshot of an exemplary embodiment of the settings interface configured to initiate remote listen mode. As illustrated, a button 1105 can be included and configured to initiate remote listen mode upon selection.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:

1. A method, comprising:
at an electronic device with a display that is paired with a set of two or more individual wireless audio output devices, including a first wireless audio output device that is designated for outputting audio to a right ear of a user and a second wireless audio output device that is designated for outputting audio to a left ear of the user:
receiving a request to display status information about the set of two or more individual wireless audio output devices;
in response to receiving the request to display the status information, obtaining information identifying the set of two or more individual wireless audio output devices and wirelessly receiving status information from the set of two or more individual wireless audio output devices, wherein the obtained information includes a shared identifier pertaining to all devices in the set of two or more individual wireless audio output devices; and
causing the electronic device to display a status user interface for the set of two or more individual wireless audio output devices, including concurrently displaying in the status user interface:
a first battery status indicator for the first wireless audio output device along with an indication that the first battery status indicator relates to the device that is designated for outputting audio to the right ear of the user;
a second battery status indicator for the second wireless audio output device along with an indication that the second battery status indicator relates to the device that is designated for outputting audio to the left ear of the user; and
the information including the shared identifier pertaining to all devices in the set of two or more individual wireless audio output devices.

2. The method of claim 1, wherein the method includes, in response to receiving the request, replacing display of a selection user interface for selecting from a displayed list of available wireless audio output devices a set of wireless audio output devices to connect to the electronic device with the status user interface for the set of two or more individual wireless audio output devices which is currently connected to the electronic device, wherein the displayed list of available wireless audio output devices includes an individual entry listing said set of two or more individual wireless audio output devices.

3. The method of claim 1, wherein the status user interface for the set of two or more individual wireless audio output devices further includes displaying one or more controls for controlling audio settings of both the first wireless audio output device and the second wireless audio output device.

4. The method of claim 3, wherein the one or more controls for controlling audio settings include a single control for controlling volume of both the first wireless audio output device and the second wireless audio output device.

5. The method of claim 3, wherein the one or more controls for controlling audio settings include a first control for controlling volume of the first wireless audio output device and a second control for controlling volume of the second wireless audio output device.

6. The method of claim 1, wherein the individual wireless audio output devices have separate wireless connections to the electronic device.

7. The method of claim 1, wherein the status user interface displays controls for adjusting operation of devices separately.

8. The method of claim 1, wherein the status user interface further includes displaying a control with preset program settings that apply to both the first wireless audio output device and the second wireless audio output device.

9. The method of claim 1, wherein the status user interface displays controls for a first preset program setting that is set for only the first wireless audio output device and a second preset program setting that is set for only the second wireless audio output device.

10. A non-transitory computer readable storage medium storing one or more programs, the one or more programs comprising instructions which, when executed by an electronic device with a display, cause the electronic device to:
receive a request to display status information about a set of two or more individual wireless audio output devices that are paired with the electronic device, the set of two or more individual wireless audio output devices including a first wireless audio output device that is designated for outputting audio to a right ear of a user and a second wireless audio output device that is designated for outputting audio to a left ear of the user;
in response to receiving the request to display the status information, obtain information identifying the set of two or more individual wireless audio output devices and wirelessly receive status information from the set of two or more individual wireless audio output devices, wherein the obtained information includes a shared identifier pertaining to all devices in the set of two or more individual wireless audio output devices; and
display a status user interface for the set of two or more individual wireless audio output devices, including concurrently displaying in the status user interface:
a first battery status indicator for the first wireless audio output device along with an indication that the first battery status indicator relates to the device that is designated for outputting audio to the right ear of the user;
a second battery status indicator for the second wireless audio output device along with an indication that the second battery status indicator relates to the device that is designated for outputting audio to the left ear of the user; and
the information including the shared identifier pertaining to all devices in the set of two or more individual wireless audio output devices.

11. The non-transitory computer readable storage medium of claim 10, wherein the one or more programs further comprise instructions which, when executed by the electronic device, cause the electronic device to: in response to receiving the request, replacing display of a selection user interface for selecting from a displayed list of available wireless audio output devices a set of wireless audio output devices to connect to the electronic device with the status user interface for the set of two or more individual wireless audio output devices which is currently connected to the electronic device, wherein the displayed list of available wireless audio output devices includes an individual entry listing said set of two or more individual wireless audio output devices.

12. The non-transitory computer readable storage medium of claim 10, wherein the status user interface for the set of two or more individual wireless audio output devices further includes displaying one or more controls for controlling audio settings of both the first wireless audio output device and the second wireless audio output device.

13. The non-transitory computer readable storage medium of claim 12, wherein the one or more controls for controlling audio settings include a single control for controlling volume of both the first wireless audio output device and the second wireless audio output device.

14. The non-transitory computer readable storage medium of claim 12, wherein the one or more controls for controlling audio settings include a first control for controlling volume of the first wireless audio output device and a second control for controlling volume of the second wireless audio output device.

15. The non-transitory computer readable storage medium of claim 10, wherein the individual wireless audio output devices have separate wireless connections to the electronic device.

16. The non-transitory computer readable storage medium of claim 10, wherein the status user interface displays controls for adjusting operation of devices separately.

17. The non-transitory computer readable storage medium of claim 10, wherein the status user interface further includes displaying a control with preset program settings that apply to both the first wireless audio output device and the second wireless audio output device.

18. The non-transitory computer readable storage medium of claim 10, wherein the status user interface displays controls for a first preset program setting that is set for only the first wireless audio output device and a second preset program setting that is set for only the second wireless audio output device.

19. An electronic device, comprising:
one or more processors;
memory;
a display; and
one or more programs, wherein the one or more programs are stored in the memory and configured to be executed by the one or more processors, the one or more programs including instructions for:

receiving, at the electronic device, a request to display status information about a set of two or more individual wireless audio output devices that are paired with the electronic device, the set of two or more individual wireless audio output devices including a first wireless audio output device that is designated for outputting audio to a right ear of a user and a second wireless audio output device that is designated for outputting audio to a left ear of the user;

in response to receiving the request to display the status information, obtaining information identifying the set of two or more individual wireless audio output devices and wirelessly receiving status information from the set of two or more individual wireless audio output devices, wherein the obtained information includes a shared identifier pertaining to all devices in the set of two or more individual wireless audio output devices; and causing the electronic device to display a status user interface for the set of two or more individual wireless audio output devices, including concurrently displaying in the status user interface:

a first battery status indicator for the first wireless audio output device along with an indication that the first battery status indicator relates to the device that is designated for outputting audio to the right ear of the user;

a second battery status indicator for the second wireless audio output device along with an indication that the second battery status indicator relates to the device that is designated for outputting audio to the left ear of the user; and the information including the shared identifier pertaining to all devices in the set of two or more individual wireless audio output devices.

20. The electronic device of claim 19, wherein the one or more programs include instructions for, in response to receiving the request, replacing display of a selection user interface for selecting from a displayed list of available wireless audio output devices a set of wireless audio output devices to connect to the electronic device with the status user interface for the set of two or more individual wireless audio output devices which is currently connected to the electronic device, wherein the displayed list of available wireless audio output devices includes an individual entry listing said set of two or more individual wireless audio output devices.

21. The electronic device of claim 19, wherein the status user interface for the set of two or more individual wireless audio output devices further includes displaying one or more controls for controlling audio settings of both the first wireless audio output device and the second wireless audio output device.

22. The electronic device of claim 21, wherein the one or more controls for controlling audio settings include a single control for controlling volume of both the first wireless audio output device and the second wireless audio output device.

23. The electronic device of claim 21, wherein the one or more controls for controlling audio settings include a first control for controlling volume of the first wireless audio output device and a second control for controlling volume of the second wireless audio output device.

24. The electronic device of claim 19, wherein the individual wireless audio output devices have separate wireless connections to the electronic device.

25. The electronic device of claim 19, wherein the status user interface displays controls for adjusting operation of devices separately.

26. The electronic device of claim 19, wherein the status user interface further includes displaying a control with preset program settings that apply to both the first wireless audio output device and the second wireless audio output device.

27. The electronic device of claim 19, wherein the status user interface displays controls for a first preset program setting that is set for only the first wireless audio output device and a second preset program setting that is set for only the second wireless audio output device.

* * * * *